(No Model.) 2 Sheets—Sheet 1.

E. CARLSON.
GATE CONTROLLER FOR ELEVATORS.

No. 575,753. Patented Jan. 26, 1897.

Witnesses:
E. F. Elmore
Harry Kilgore

Inventor
Edwin Carlson
By his Attorney,
Jas. F. Williamson

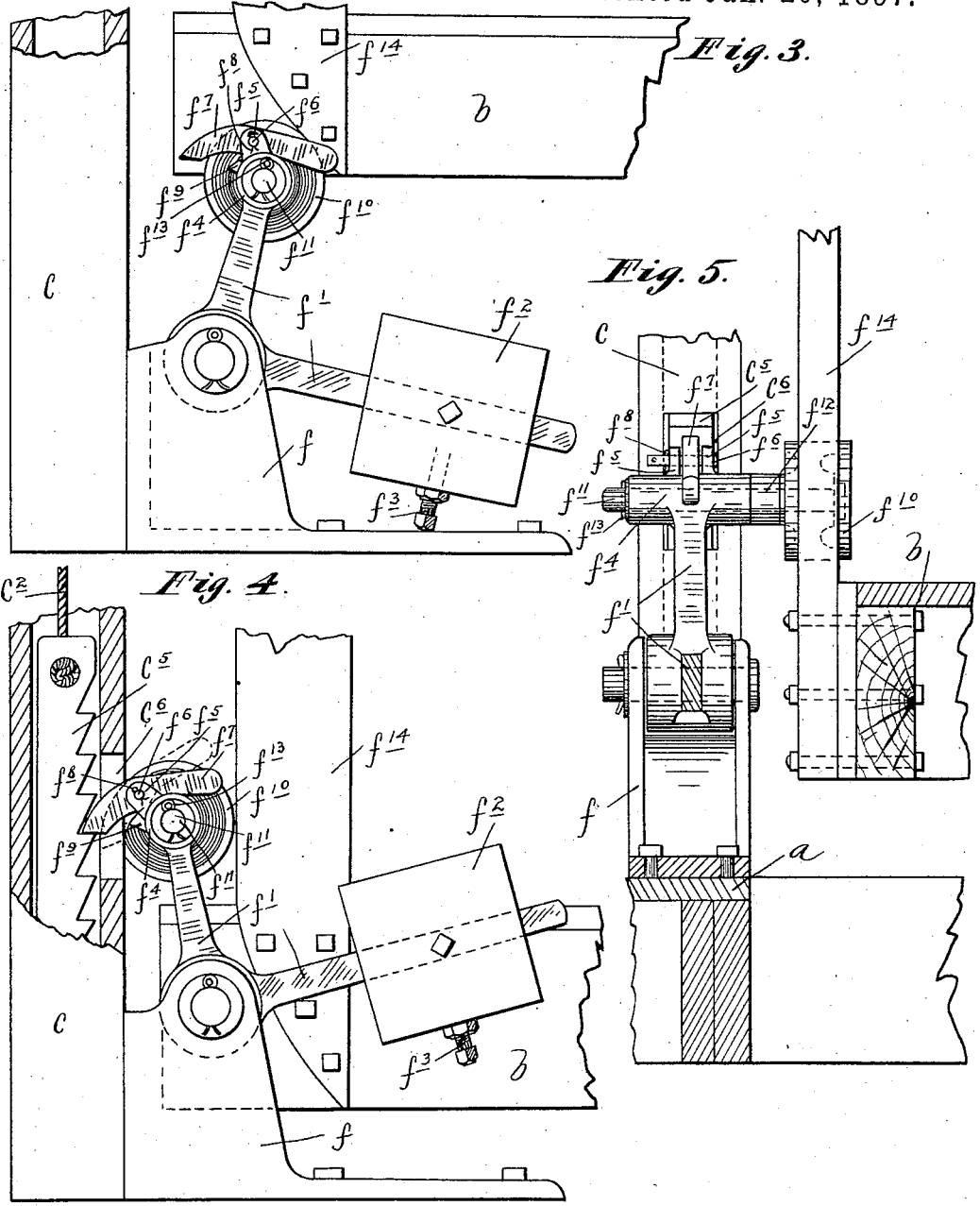

UNITED STATES PATENT OFFICE.

EDWIN CARLSON, OF MINNEAPOLIS, MINNESOTA.

GATE-CONTROLLER FOR ELEVATORS.

SPECIFICATION forming part of Letters Patent No. 575,753, dated January 26, 1897.

Application filed June 17, 1896. Serial No. 595,930. (No model.)

*To all whom it may concern:*

Be it known that I, EDWIN CARLSON, a citizen of the United States, residing at Minneapolis, in the county of Hennepin and State of Minnesota, have invented certain new and useful Improvements in Gate-Controllers for Freight-Elevators; and I do hereby declare the following to be a full, clear, and exact description of the invention, such as will enable others skilled in the art to which it appertains to make and use the same.

My invention has for its object to provide an attachment for use in connection with elevators having self-closing gates.

Though capable of general application, the invention was especially designed for use in connection with freight-elevators for holding the gates in their open position when the elevator is in loading position and for releasing the gates in order to permit the same to close whenever the elevator moves away from its loading position.

To these ends my invention consists of the novel devices and combination of devices hereinafter described, and defined in the claims.

The invention is illustrated in the accompanying drawings, wherein, like letters referring to like parts throughout the several views—

Figure 1:
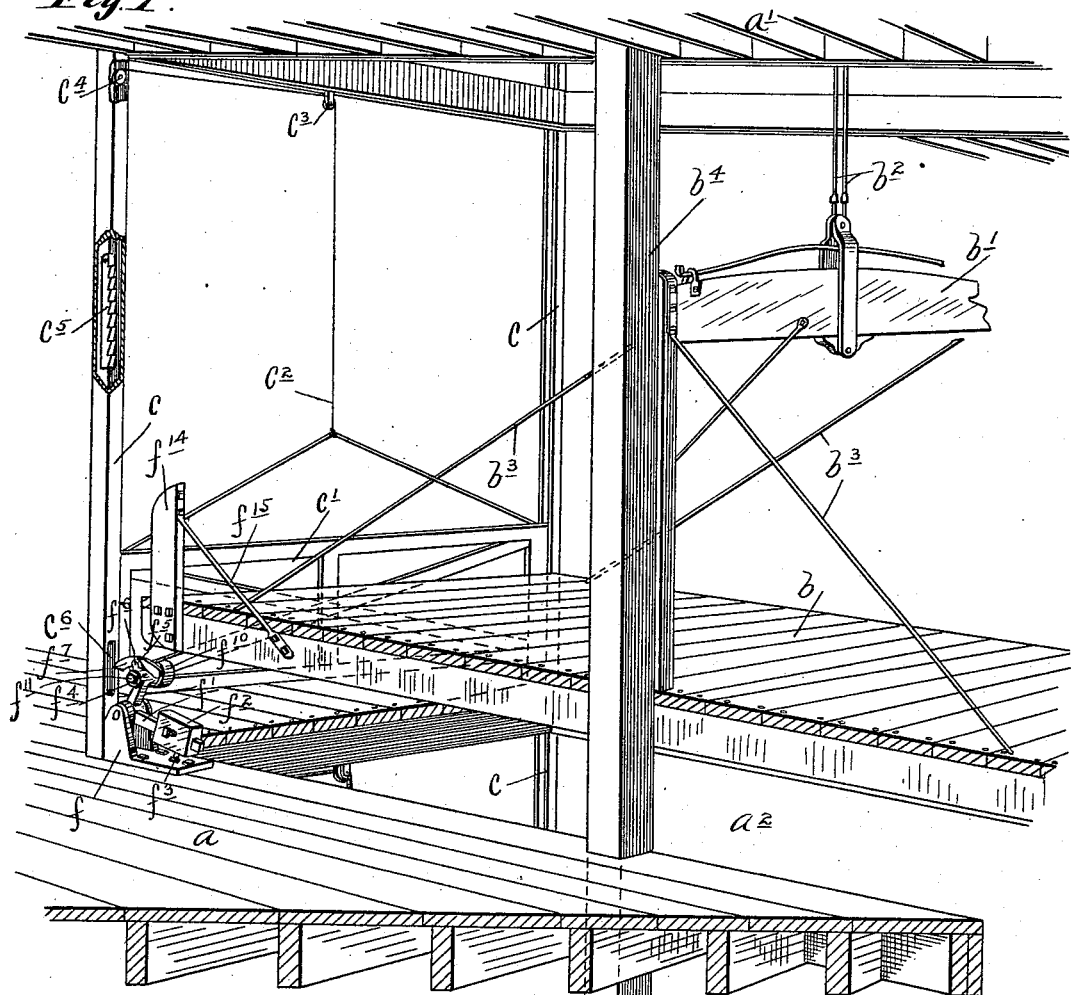
Figure 2:
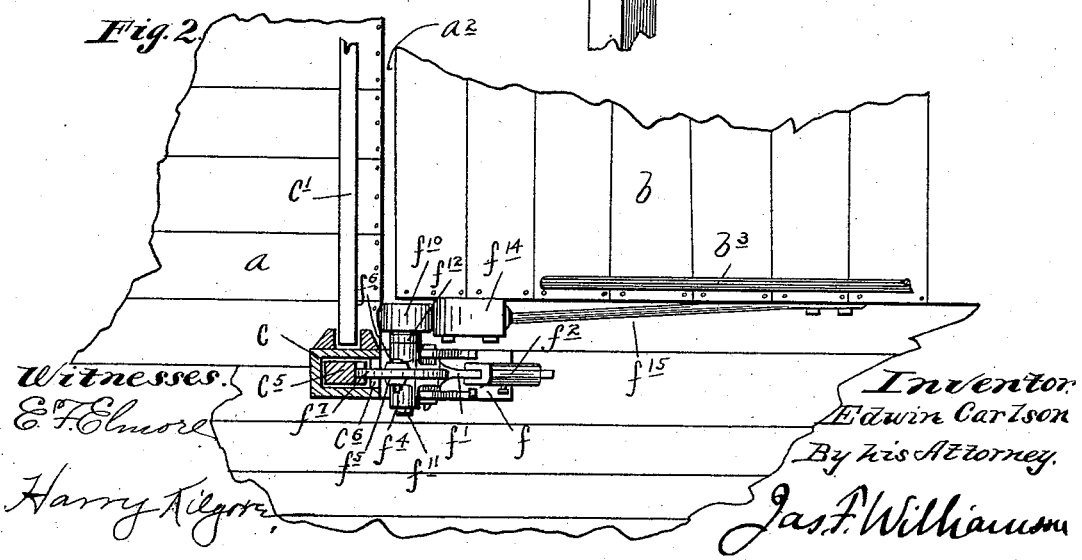

Figure 1 is a view chiefly in perspective, but partly in section, with some portions broken away and others removed, showing my device in working position. Fig. 2 is a view of some of the same parts shown in Fig. 1, partly in plan and partly in horizontal section, with the dog shown in its locking position or same position as shown in Fig. 4. Fig. 3 is a detail in side elevation showing the gate-controlling device in its normal or idle position, but as just about to be operated upon by the cam-shoe on the elevator-platform for throwing the same into the position shown in Fig. 4. Fig. 4 is a view similar to Fig. 3 with some portions broken away showing the controlling device as it would appear after having been thrown into its locking position by the cam-shoe on the elevator-platform; and Fig. 5 is a view, partly in elevation and partly in vertical section, looking from the inside of the elevator-shaft outward.

$a\ a'$ represent floors in the building. $a^2$ represent the passages therethrough for the elevator-platform.

$b\ b'\ b^2\ b^3$ represent the well-known parts of the ordinary freight-elevator.

$b^4$ represents one of the guide columns or uprights for the elevator-car.

The netting, guard-rails, or sheeting, which would ordinarily be applied to cut off the side of the elevator well or shaft from the floors, is not shown, the same being removed for the better illustration of the working parts.

$c$ represents the vertical columns or guides for the self-closing gate $c'$ for a given floor. The gate $c'$ is provided with a cable $c^2$, passing upward over a guide-sheave $c^3$ and then over a guide-sheave $c^4$ at the upper end of one of the guide-posts $c$. As shown, the sheave $c^4$ is at the top of the outer post $c$, and this post is of box-like form, adapted to serve as a guide for a ratchet-faced weight $c^5$, attached to the outer end of the cable $c^2$. This weight $c^5$ partially counterpoises the gate $c'$, but is sufficiently lighter than the said gate to insure the closing of the gate under the action of gravity. The said post $c$, within which is mounted the weight $c^5$, is provided near its lower end with a slot $c^6$ in its back surface.

$f$ is a bearing-bracket, shown as bolted to the floor, directly adjacent to the foot of the post $c$, containing the slot $c^6$. To the said bracket $f$ is pivoted, at its elbow, a bell-crank lever $f'$. On the lower arm of this bell-crank lever is adjustably mounted a weight $f^2$, adapted to be set in any desired position by a jam-bolt $f^3$. The upper arm of the bell-crank lever $f'$ terminates in a long bearing-hub $f^4$. The said hub $f^4$ is provided on its periphery with bearing-lugs $f^5$, to which is secured, by a pin $f^6$, a gravity-dog $f^7$, adapted to work through the slot $c^6$ in the post $c$ and engage with the teeth of the ratchet-faced weight $c^5$ when the parts are in the position shown in Figs. 2, 4, and 5. The pin $f^6$ is held in position by a cotter or split key $f^8$. The outer arm of the dog $f^7$ is heavier than the inner arm, and tends to hold the same in the position shown in Figs. 1 and 3. The hub $f^4$ serves to limit the downward movement of the outer or weighted arm of said dog $f^7$, and a stop-lug $f^9$ on the face of said hub serves the like purpose for the light arm of said dog.

A roller $f^{10}$ is secured by a headed bolt or stud-shaft $f^{11}$ to the hub $f^4$ of the bell-crank lever, and is properly spaced apart at the right distance inward toward the center of the elevator-shaft by means of one or more spacing-washers $f^{12}$. The stud-shaft or bolt $f^{11}$ is secured in working position, as shown, by means of a cotter or split key $f^{13}$.

To the corner of the elevator-platform $b$, adjacent to the bell-crank lever $f'$, is bolted a cam-shoe $f^{14}$, (shown as braced by a rod $f^{15}$.) This cam-shoe $f^{14}$ is in proper position for action on the roller $f^{10}$ of the gate-controlling device under the movement of the elevator car or platform.

Having regard to the action, suppose the parts to be in the position shown in Fig. 1 and the elevator-platform to be moving downward. It is obvious then that, under the further downward movement of the platform $b$, the cam-shoe $f^{14}$ will engage with the roller $f^{10}$, as shown in Fig. 3, and, under the further movement of the platform, will tip the bell-crank lever $f'$ and the parts carried thereby into the position shown in Fig. 4. On reaching or approaching the loading position of the elevator-platform at the floor-level the operator will raise the gate $c'$ and thereby cause the weight $c^5$ to lower into the position shown in Fig. 4 and cause the ratchet-teeth or, more accurately stated, some member thereof on the face of the weight to engage with the dog $f^7$. The parts are of course so proportioned that when the weight $c^5$ reaches its lowermost limit the gate $c'$ will be at its highest level, sufficient for the largest amount of clearance that may be desired under the gate. As quick as the ratchet-teeth of the weight $c^5$ are engaged by the dog $f^7$ it is obvious that the gate cannot return downward until after the high part of the cam-shoe $f^{14}$ on the platform has passed by the roller $f^{10}$. Hence as long as the elevator car or platform is in loading position the gate will be locked in its elevated or raised position. As quick as the shoe $f^{14}$ passes off from the roller $f^{10}$ in either direction the weight $f^2$ will become operative to return the parts of the gate-controlling device into their normal or idle position, as shown in Figs. 1 and 3.

From the drawings and the foregoing description it must be obvious that the gate-controlling device herein disclosed is of extremely cheap and simple construction and at the same time reliable and effective for the purposes had in view.

The spacing-washers $f^{12}$ may of course be increased or decreased in number or omitted altogether, according to the reach required for bringing the roller $f^{10}$ into the path of the cam-shoe $f^{14}$ on the car. Likewise the dog $f^7$ may be set in any one of three different positions in respect to the lugs $f^5$ in order to bring the same in proper position for alinement with the ratchet-faced weight $c^5$. The gate-controlling device herein shown is therefore readily applied to any freight-elevator.

The advantage of a gate-controlling device of this kind for preventing accidents is of course obvious.

It should have been noted that the outward rocking movement of the bell-crank $f'$ is limited by the engagement of the bearing-hub $f^4$ with the back of the guide-post $c$. Hence the dog $f^7$ cannot be driven by the cam-shoe $f^{14}$ so far into the guide-box $c$ as to interfere with the downward movement of the ratchet-faced weight $c^5$ into its locking position.

What I claim, and desire to secure by Letters Patent of the United States, is as follows:

1. The combination with an elevator and a self-closing entrance-gate having a ratchet-faced counterweight, of a gate-controller comprising a bell-crank lever, on the floor, normally held by gravity in its idle position, a pivoted dog on the upper arm of said lever, and a cam-shoe on the car operating on said bell-crank for causing the dog to engage the gate-weight and lock the gate in its raised position while the car is in loading position, substantially as described.

2. The combination with an elevator and self-closing entrance-gate having the ratchet-faced counterweight $c^5$, moving in a suitable guide $c$, of the bell-crank lever $f'$, on the floor, the weight $f^2$ on the lower arm of said lever, the pivoted dog $f^7$ on the top of said lever, the bolt or stud-shaft $f^{11}$ carried by the upper arm of said lever, the roller $f^{10}$ on the shaft $f^{11}$ and the cam-shoe $f^{14}$ on the car, all coöperating substantially as described.

In testimony whereof I affix my signature in presence of two witnesses.

EDWIN CARLSON.

Witnesses:
JAS. F. WILLIAMSON,
BESSIE B. NELSON.